J. G. ALTHOUSE.
CLINKER TONGS.
APPLICATION FILED DEC. 1, 1911.
1,021,290.
Patented Mar. 26, 1912.
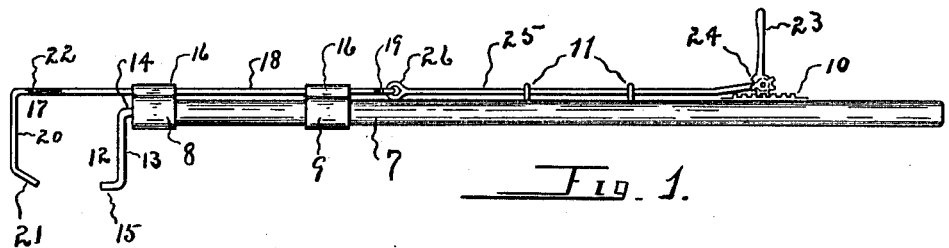
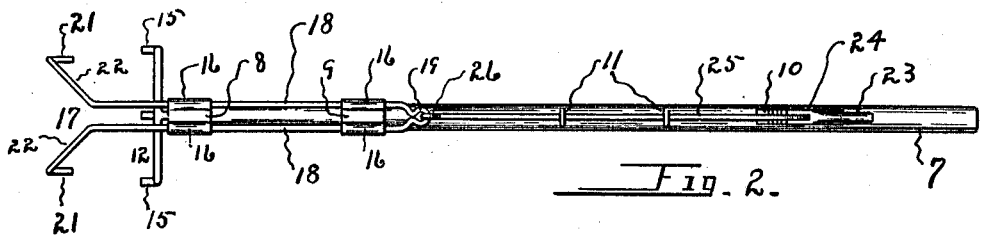
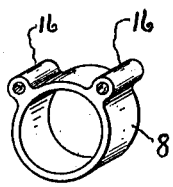
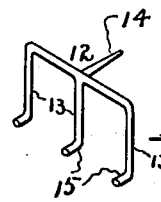
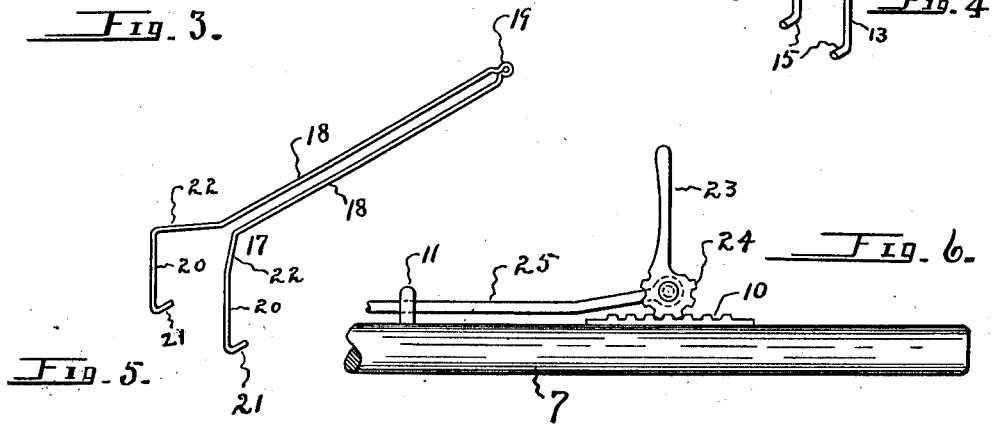
Witnesses
R. E. Borkenhagen
C. R. Harper
Inventor
John G. Althouse
By Hiram A. Sturges,
Attorney

UNITED STATES PATENT OFFICE.

JOHN G. ALTHOUSE, OF OMAHA, NEBRASKA.

CLINKER-TONGS.

1,021,290.  Specification of Letters Patent.  Patented Mar. 26, 1912.

Application filed December 1, 1911. Serial No. 663,207.

*To all whom it may concern:*

Be it known that I, JOHN G. ALTHOUSE, a citizen of the United States, residing at Omaha, in the county of Douglas and State of Nebraska, have invented certain new and useful Improvements in Clinker-Tongs, of which the following is a specification.

This invention relates to improvements in clinker tongs, and has for its object to provide an article of this class which will be simple in construction so that it may be comparatively inexpensive in manufacture, and will be convenient and effective in use for removing impacted material, clinkers or similar obstructions from the grates of furnaces generally, and especially from the grates of furnaces used in connection with steam boilers, these furnaces being of such unusual length that the ordinary clinker tongs which have swinging grip-jaws, are not practical.

The invention includes a handle bar provided with guides and a stationary fork, and a movable gripping-member consisting of a single rod bent angularly to form tines with terminal engaging-fingers, and parallel, adjacent shifting or alining-arms, these arms being mounted in the guides to prevent lateral movement, and slidable therein for gripping or releasing the clinkers, devices being provided for forcibly moving the gripping-member longitudinally of the handle bar.

The invention consists of the novel construction, combination and arrangement of parts as described herein and claimed, and as illustrated in the drawing, wherein,—

Figure 1 is a side view of the clinker tongs. Fig. 2 is a plan view of the same. Figs. 3, 4 and 5 are perspective, detail views of parts of the device. Fig. 3 shows one of the collars with guides. Fig. 4 is a view of the fork. Fig. 5 shows the movable gripping-member; and Fig. 6 is a side view of the rack and toothed hand-wheel for moving one of the gripping-members.

Referring now to the drawing for a more particular description, numeral 7 indicates a handle bar provided at one of its terminals with a collar 8, and adjacent thereto with a collar 9, a rack-bar 10 being suitably secured upon and near the opposite end of the handle bar; and screw-eyes 11 are mounted upon the upper side and at longitudinal intervals of said bar, between the rack bar and collar 9, said screw-eyes being in alinement with the rack-bar. And at 12, having a shank mounted in the end of the handle bar and circumscribed by collar 8, is indicated a fork having tines 13 projecting downwardly from its shank 14; and preferably the terminals 15 of tines 13 project forwardly. Collars 8 and 9 are each formed with a pair of parallel, adjacent sleeves 16, and are so disposed that the sleeves of one collar are in alinement, substantially, with the sleeves of the other collar, said sleeves being upon the upper side of the handle bar.

At 17 is indicated a movable gripping-member or fork which may be economically constructed of a single metallic rod bent at its middle to provide the pair of adjacent, parallel arms 18 and a terminal loop 19, said rod, near its free ends, being bent downwardly, as shown in Fig. 1, at substantially right angles to arms 18, and providing tines 20 to be disposed forwardly of member 12, said tines having rearwardly projecting terminals 21. Tines 20 are disposed at a greater distance apart than arms 18, this being effected by bending the rod to form the outwardly divergent arms 22, between tines 20 and the parallel arms 18. As thus described, the terminals 15 and 21 of the respective tines 13 and 20 project toward each other. The parallel arms of member 17 are mounted in sleeves 16 and may have slidable movements therein to dispose tines 20, during operation, near to or farther from member 12, as may be desired, for engagement or disengagement with the clinkers.

At 23 is indicated an operating handle provided with a segmentally toothed head 24, and pivotally mounted thereon is one end of the connecting rod 25, said rod engaging within screw-eyes 11; and its opposite end has a loop 26 connected with loop 19 of arms 18. Rod 25 should be sufficiently rigid so that, during operation, arms 18 may be forcibly moved forward, and it should be elastic in a degree to permit the toothed head to be manually lifted free from the rack 10, whenever desired.

Among some of the advantages of the present structure, it may be stated that it is particularly useful for the removal of clinkers from exceptionally long grates or furnaces, the reason for this being that there is no pivotal connection of the two gripping-members, the movement of member 17 being longitudinally of the handle bar.

In operation, member 17 may be manually shifted forward by use of handle 23, and after member 12 engages a clinker the connecting rod may be drawn rearwardly until the projecting terminals 21 of prongs 20 also engage it. At this time, head 24, being in engagement with rack 10, a rearward swinging movement of handle 23, which may be conveniently effected, will cause a further rearward movement of member 17 in the direction of member 12, to obtain a firm grip upon the clinker or other object to be removed.

It will be noted that the use of the rack and toothed handle is of advantage, during operation, to forcibly move gripping member 17 forwardly from member 12 when separating these members for engagement therebetween of the clinkers.

It is quite necessary, during operation, that any lateral movement of arms 18 upon the handle bar 7 be prevented, also that these arms be maintained parallel with the handle bar, and for these purposes guides or sleeves 16 are employed.

Having fully described the several parts of the device, and their uses, a further explanation relating to operation is not necessary.

What I claim and desire to secure by Letters Patent is,—

1. A clinker tongs, comprising, in combination with a handle bar provided at one of its terminals with a fork projecting transversely therefrom and provided near its opposite terminal with a rack bar; sleeve-members mounted in alinement upon the handle bar; a gripping-member consisting of a rod bent at its middle to form a terminal loop and forming a pair of shifting-arms for mounting in said sleeve-members, and bent near its free ends to provide transverse prongs to be disposed outwardly of said fork; an operating handle provided with segmentally arranged teeth for engagement with the rack bar; and a connecting-rod mounted upon the handle bar and having pivotal connections with the operating-handle and the loop of said shifting-arms.

2. A clinker tongs, comprising, in combination with a handle bar provided at one of its terminals with a fork projecting transversely therefrom and provided near its opposite terminal with a rack bar; collars formed with sleeves and mounted upon the handle bar with their sleeves in alinement; a gripping-member consisting of a rod bent at its middle to form a terminal loop and providing parallel, adjacent arms for mounting in said sleeves, and bent substantially at right angles near its free ends to provide prongs to be disposed outwardly of said fork; an operating handle provided with segmentally arranged teeth adapted to engage said rack bar; and a connecting-rod mounted upon the handle bar and having a pivotal connection with the handle bar and said terminal loop.

3. In combination, a handle bar provided at longitudinal intervals with guides arranged in pairs, said bar being provided at one of its terminals with a transverse fork and near its opposite terminal with a rack-bar; a gripping-member formed with parallel arms bent near their terminals to form transverse prongs, said gripping-member being disposed with its arms parallel with the handle bar in engagement with said guides, its prongs projecting substantially parallel with and outwardly of said fork; an operating handle having segmentally arranged teeth for engagement with the rack-bar; and a connecting-rod extending between and having pivotal connections with the operating handle and said parallel arms.

In testimony whereof I have affixed my signature in presence of two witnesses.

JOHN G. ALTHOUSE.

Witnesses:
 HIRAM A. STURGES,
 A. F. CLARK.